March 2, 1926.
A. N. ANTHES
1,574,746
DOUBLE ACTING SPRING SNUB
Filed Jan. 15, 1924
2 Sheets-Sheet 1
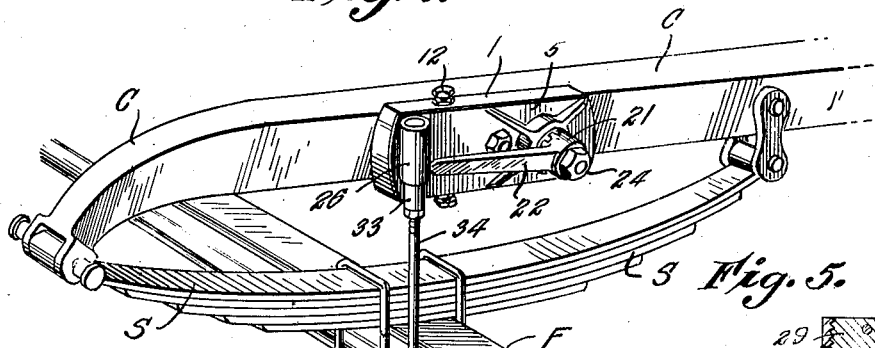

March 2, 1926.
A. N. ANTHES
1,574,746
DOUBLE ACTING SPRING SNUB
Filed Jan. 15, 1924
2 Sheets-Sheet 2
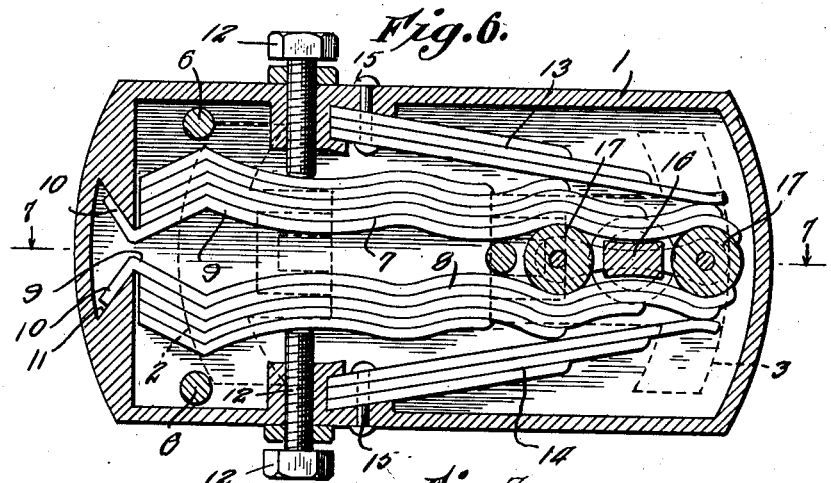
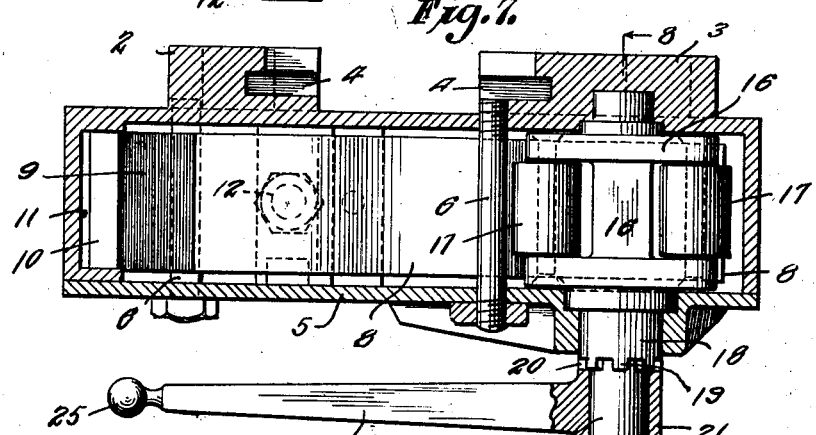
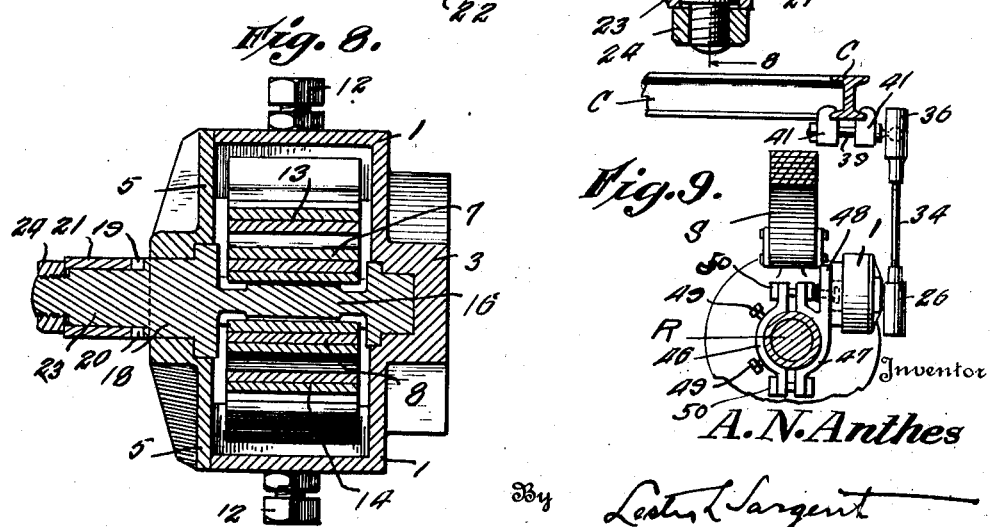
Inventor
A. N. Anthes
By Lester L. Sargent
Attorney Patented Mar. 2, 1926.

1,574,746

UNITED STATES PATENT OFFICE.

ALBERT N. ANTHES, OF QUINCY, ILLINOIS, ASSIGNOR OF ONE-HALF TO ROBERT F. GUNTHER, OF QUINCY, ILLINOIS.

DOUBLE-ACTING SPRING SNUB.

Application filed January 15, 1924. Serial No. 686,444.

*To all whom it may concern:*

Be it known that I, ALBERT N. ANTHES, a citizen of the United States residing at Quincy, in the county of Adams and State of Illinois, have invented new and useful Double-Acting Spring Snubs, of which the following is a specification.

The object of my invention is to provide a shock absorbing device for automobiles which will take up the shock in both directions and which will function with a high degree of efficiency; and to provide a novel combination and arrangement of parts in such a device, and to provide a device which can be readily attached to the automobile chassis as now constructed. I attain these and other objects of my invention by the mechanism illustrated in the accompanying drawings, in which—

Figure 1 is a perspective view of my invention in use;

Fig. 2 is a top plan of my device, partly in section;

Fig. 3 is a vertical section on line 3—3 of Fig 2;

Fig. 4 is a side elevation of the device attached to the rear axle;

Fig. 5 is a vertical, longitudinal sectional view, showing the ball joints 25 and 38 and connecting rod 34;

Fig. 6 is a vertical, longitudinal sectional view through the casing in which the shock absorbing springs are mounted, the springs being shown in side elevation;

Fig. 7 is a horizontal cross section, approximately on the line 7—7 of Fig. 6;

Fig. 8 is a vertical cross section on line 8—8 of Fig. 7;

Fig. 9 is a detail sectional view of a modified form of attachment for any type of car where the spring is parallel with the axle, as, for example, the Ford.

Like characters of reference designate like parts in each of the several views.

Referring to the accompanying drawings, I provide a suitable casing 1, preferably of approximately rectangular shape, having bosses 2 and 3 on one side of the casing or box 1, these bosses being chambered at 4 to receive the heads of bolts B, by means of which the device is attached to the chassis C of the automobile, as illustrated in Figs. 2 and 3. I provide a suitable cover plate 5, removably fastened on the box 1 by stud bolts 6. I provide snubber floating springs 7 and 8, consisting of a series of leaves of the shape illustrated in Fig. 6, having a series of transverse waves, the springs 7 and 8 being oppositely arranged and each provided with an inner leaf 9, which has an angularly bent end or extension 10 seating in the recess 11 in the end of box 1, as shown in Figs. 6 and 7. I provide spring adjusting screws 12, having their ends abutting against springs 7 and 8, as shown in Fig. 6. I provide snubber rebound springs 13 and 14, suitably affixed at 15 to box 1 and having their free ends bearing against springs 7 and 8, respectively.

I provide a roller carriage or body 16, carrying the rollers 17, said carriage being pivotally mounted in box 1 on its shaft or hub 18. The outer end of shaft 18 is provided with ratchet teeth 19, engaging corresponding ratchet teeth 20 of hub 21, which carries arm 22, the latter terminating in the ball 25. Hub 21 seats on the reduced end 23 of the shaft 18 and is held in place by nut 24.

The ball end 25 of arm 22 is mounted in a ball joint socket 26, which latter device consists of sleeve 27, slotted at 28 to allow for the reciprocation of arm 22, the sleeve 27 carrying plug or spawl 29, suitably concaved to receive ball end 25, and also carrying a slidable ball cup 31, concaved to bear against the opposite side of the ball end 25 and held in resilient engagement with the ball end 25 by the ball joint spring 32. Sleeve 27 is provided with a screw threaded sleeve extension 33, to which the adjusting link 34 is attached and secured by lock nut 37.

I provide a second ball joint socket 36, of like construction to device 26 above described and operatively engaging the ball end 38 of bolt 39, which with nut 40 operatively attaches the device by means of opposite clamps 41 to the frame F of the automobile, as shown in Figs. 1 and 5.

Referring to Fig. 4, which shows the device attached to the rear axle of a car, I provide axle clamps 43, secured through the axle by bolts 44 and radial set screws 45, and a short ball arm 42 secured between clamps 43 and having its ball end seated in ball joint socket 36.

Referring to Fig. 9, which shows the form of the invention used for attaching the device to the rear end of any car that has the springs hung over or parallel with the axle, the shock absorbing device being affixed to the tangential extension 48 provided on the clamp 47, which with clamp 46 is secured to axle R by bolts 50 and set screws 49. The vehicle spring is indicated by S.

In operation, the box 1 is affixed to a suitable portion of the vehicle, such as a portion of the chassis, as shown in Fig. 1, and a resilient operative connection is provided with another part of the vehicle, by means of the two sets of springs in box 1, the roller carriage and rollers operatively engaged by said springs, the arm 22, ball socket 26, adjusting link 34, ball socket 36, ball arm 38 (or 39 in the case of the modified form), and clamps 41 engaging frame F, as shown in Figs. 1, 4, 5 and 9. As the cover plate 5 is removable, convenient access may be had to the interior of box 1. Adjusting screws 12 provide a convenient means for adjusting the tension of the shock absorber device. The springs are merely seated in their operative position and do not require any bolts or other fastening devices to secure them in place. The opposite arrangement of the springs 7 and 8 and 13 and 14 in box 1 provides a device that takes up shock in both directions and is thus very efficient in snubbing or checking shocks encountered by the vehicle.

The term "ball arm" as used in the appended claims as referring to the second named member having a ball end shall be construed to refer to either the short ball arm member 42 or the ball bolt member 39, having an equivalent function.

What I claim is:

1. In a double acting shock absorbing device for vehicles, a link connection comprising an arm, said arm having a ball end, a second ball arm clamped to the axle portion of the vehicle, ball joint sockets in which the respective ball arms are mounted, reversely threaded sleeve extensions on the ball-joint socket, a link having reversely threaded ends adjustably connecting said reversely threaded sleeve extensions and means for attaching the link connection to the vertical frame.

2. In a device of the class described, an approximately rectangular box having an approximately triangular socket in one end thereof, oppositely disposed leaf springs, said springs being transversely waved, said springs having the inner leaf bent angularly to seat in the above described socket and secure the springs in place without bolts or rivets, a roller bearing carriage having its rollers positioned between the free ends of the aforesaid springs, an arm operatively connected on the roller bearing carriage, and means operatively connecting the end of said arm with a portion of the automobile to absorb shocks in both directions.

3. In combination with the device described in claim 2, a removable cover plate for said box, and means for detachably securing said cover plate on the box.

4. In combination with the device described in claim 2, a second set of oppositely arranged springs positioned exteriorly to the first described springs and having their free ends in engagement with the free ends of the first named springs to reinforce the first described springs, and means for securing said springs, in opposed relation in the box.

5. In a device of the class described, the combination of a box, a plurality of leaf springs transversely waved and having their inner leaves extended and bent to seat in a socket in the end of the box and hold the leaves in operative position in the box, opposite adjusting screws bearing against the leaves, a roller bearing carriage having roller bearings seated in spaced waved portions of the free ends of the leaves, the carriage being interposed between the leaves, rebound springs affixed to the box and having their free ends abutting against the free ends of the first named oppositely disposed springs to reinforce same, the box having means for affixing it to a portion of the vehicle, and an arm operatively attached to the carriage whereby shocks affecting the free end of the arm will be transmitted to and taken up by the oppositely arranged springs in the box.

6. In combination with an arm having a ball end and means for resiliently resisting shocks transmitted to the ball end of the arm, a ball joint socket with which the ball end of the arm resiliently engages, a second ball arm, a second socket with which the ball end of said second ball arm resiliently engages, reversely threaded sleeve extensions on the aforesaid sockets, and means for securing said ball arm in clamped or affixed engagement with a spaced part of the vehicle which receives shocks, and a link having reversely threaded ends adjustably engaging the aforesaid reversely threaded sleeve extensions and lock nuts securing said link in adjusted engagement with said members.

7. In a device of the class described, the combination of a box, a plurality of leaf springs transversely waved and having their inner leaves extended and bent to seat in a socket in the end of the box and hold the leaves in operative position in the box, opposite adjusting screws bearing against the leaves, a roller bearing carriage having roller bearings seated in spaced waved portions of the free ends of the leaves, the carriage being interposed between the leaves, rebound springs affixed to the box and having their free ends abutting against the free ends of the first named oppositely disposed springs to reinforce same, the box having means for affixing it to a portion of the vehicle, an arm operatively attached to the carriage whereby shocks affecting the free end of the arm will be transmitted to and taken up by the oppositely arranged springs in the box, and a resilient link connection between the before mentioned arm and spaced part of the vehicle which receives shocks.

ALBERT N. ANTHES.